United States Patent [19]
Yang

[11] Patent Number: 5,704,789
[45] Date of Patent: Jan. 6, 1998

[54] BEAD DRAWING KIT

[76] Inventor: Chie-Te Yang, No. 23, Sec. 1, Chung-Hwa W. Rd., Tainan City, Taiwan

[21] Appl. No.: 667,810

[22] Filed: Jun. 20, 1996

[51] Int. Cl.⁶ .......................... G09B 19/00; G09F 13/06
[52] U.S. Cl. .................. 434/96; 40/579; 446/475; 221/185; 221/239
[58] Field of Search .................. 446/146, 91, 118, 446/219, 475; 434/407, 96, 81; 40/547, 579, 439; 221/185, 239, 246, 268, 270

[56] References Cited

U.S. PATENT DOCUMENTS

| | | | |
|---|---|---|---|
| 1,087,207 | 2/1914 | Austin | 434/96 |
| 3,530,615 | 9/1970 | Meyer | 446/91 |
| 4,227,335 | 10/1980 | Kuna et al. | 446/475 X |
| 4,541,812 | 9/1985 | Katsumata | 446/91 |
| 5,287,992 | 2/1994 | Merving | 221/270 |

*Primary Examiner*—Mickey Yu
*Attorney, Agent, or Firm*—Darby & Darby

[57] ABSTRACT

A bead drawing kit includes a plurality of beads and a drawing board. A bead setting tool having a container for holding a supply of beads and having a push rod for ejecting the beads may be used to set beads on the drawing board. The drawing board includes a base member, a holding plate, a positioning plate and a base cover. The base member has a looped upright surrounding wall and a horizontal base plate disposed in the surrounding wall. The base plate has a periphery connected to the surrounding wall and is formed with a plurality of lower holes that are arranged in rows and columns for passage of the beads therethrough. The holding plate is made of a resilient material and is provided on the base plate. The holding plate is formed with a plurality of slits, each of which is aligned with a respective one of the lower holes in the base plate and forms at least two resilient fins on the holding plate for holding releasably one of the beads. The positioning plate is secured to the base plate such that the holding plate is clamped between the base plate and the positioning plate. The positioning plate is formed with a plurality of upper holes that are aligned with the slits in the holding plate to permit entry of the beads into the slits. The base cover has a bottom plate and a looped peripheral wall which extends from the bottom plate and which engages removably the surrounding wall of the base member.

18 Claims, 8 Drawing Sheets

5,704,789

BEAD DRAWING KIT

BACKGROUND OF THE INVENTION

1. Field of the Invention

The invention relates to a drawing kit, more particularly to a drawing kit in which beads are retained on a drawing board to form an image.

2. Description of the Related Art

It is known that some toys, such as puzzles and drawing kits, can enhance the imagination of children and enable them to develop an interest in the arts. Therefore, there is always a need to develop toys which can aid in the constructive growth of children.

SUMMARY OF THE INVENTION

The object of the present invention is to provide a bead drawing kit in which beads are retained on a drawing board so as to form a desired image.

Accordingly, the bead drawing kit of the present invention comprises a plurality of beads and a drawing board which includes:

- a base member having a looped upright surrounding wall and a horizontal base plate disposed in the surrounding wall, the base plate having a periphery connected to the surrounding wall and being formed with a plurality of lower holes that are arranged in rows and columns for passage of the beads therethrough;
- a holding plate made of a resilient material and provided on the base plate, the holding plate being formed with a plurality of slits, each of which is aligned with a respective one of the lower holes in the base plate and forms at least two resilient fins on the holding plate for holding releasably one of the beads;
- a positioning plate secured to the base plate such that the holding plate is clamped between the base plate and the positioning plate, the positioning plate being formed with a plurality of upper holes that are aligned with the slits in the holding plate to permit entry of the beads into the slits; and
- a base cover having a bottom plate and a looped peripheral wall which extends from the bottom plate and which engages removably the surrounding wall of the base member.

The beads can be set on the drawing board in selected ones of the slits in the holding plate to form a desired image on the drawing board. The beads can be depressed to release the same from the holding plate. The beads which are released from the holding plate pass through aligned ones of the lower holes in the base plate for collection in the base cover.

The bead drawing kit further comprises a bead setting tool for setting the beads on the drawing board. The bead setting tool includes: a bead guiding case having a first tubular portion with an open bottom section, and a second tubular portion which is parallel to and which is disposed on one side of the first tubular portion, the second tubular portion having an open top section for passage of the beads thereinto and a curved bottom section which merges with the bottom section of the first tubular portion, the bottom section of the first tubular portion being formed with a seat projection immediately below the curved bottom section of the second tubular portion to permit entry of the beads in the second tubular portion into the first tubular portion one at a time, the seat projection confining a passage which is slightly smaller than the beads so that a first one of the beads from the second tubular portion can rest on the seat projection; an elongated housing sleeved on the bead guiding case; a push rod disposed in the housing and having a top portion which is secured to the housing and a shank portion which extends downwardly from the top portion and which extends slidably into the first tubular portion of the bead guiding case, the push rod being movable with the housing relative to the bead guiding case between a first position, wherein the shank portion of the push rod has a tip which is spaced from the first one of the beads on the seat projection, and a second position, wherein the shank portion of the push rod forces the first one of the beads out of the seat projection for setting the first one of the beads on the drawing board; and a biasing unit provided in the housing for biasing the push rod to the first position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
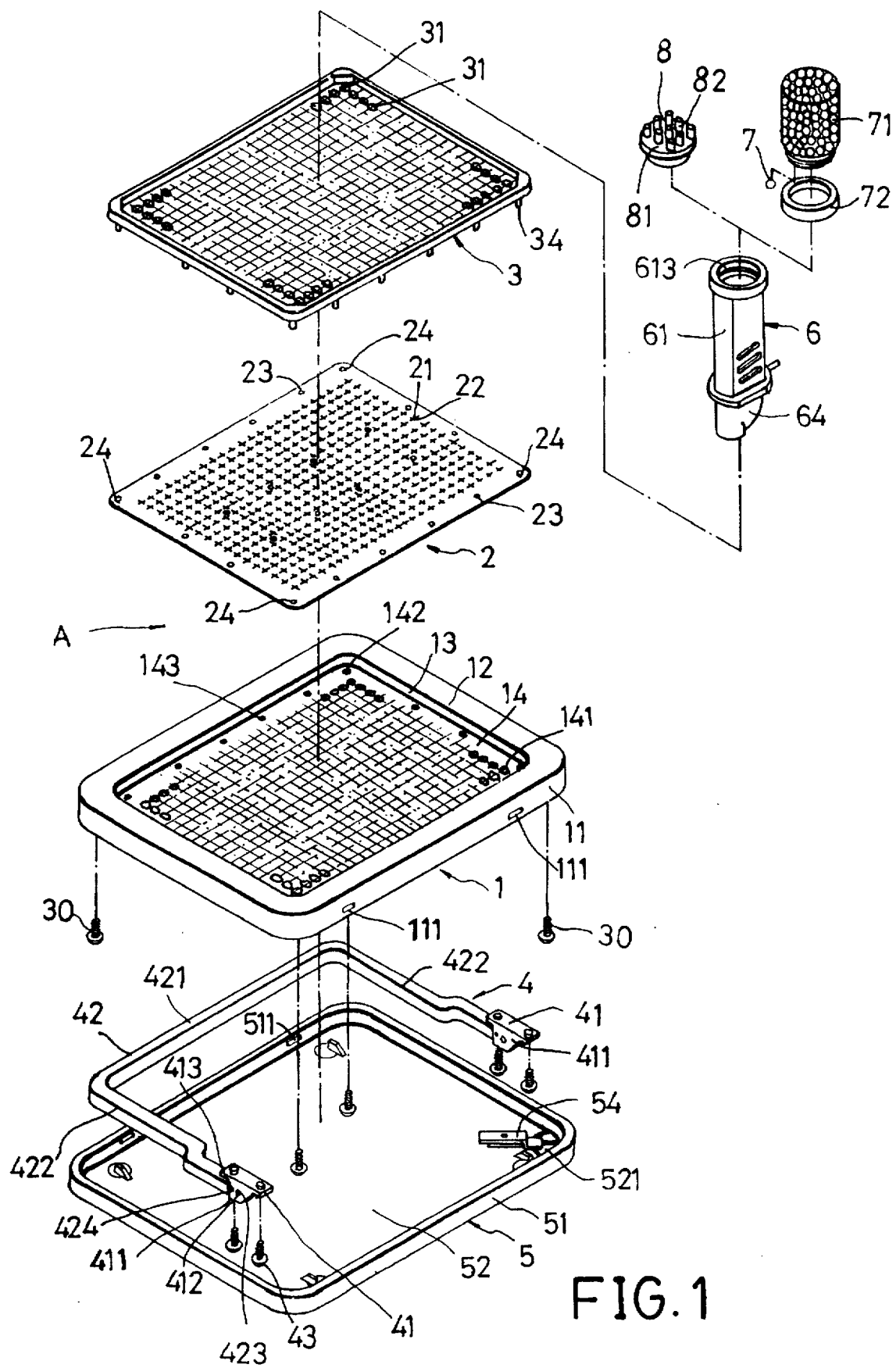
FIG. 1 is an exploded view of the preferred embodiment of a bead drawing kit according to the present invention.
Figure 2:
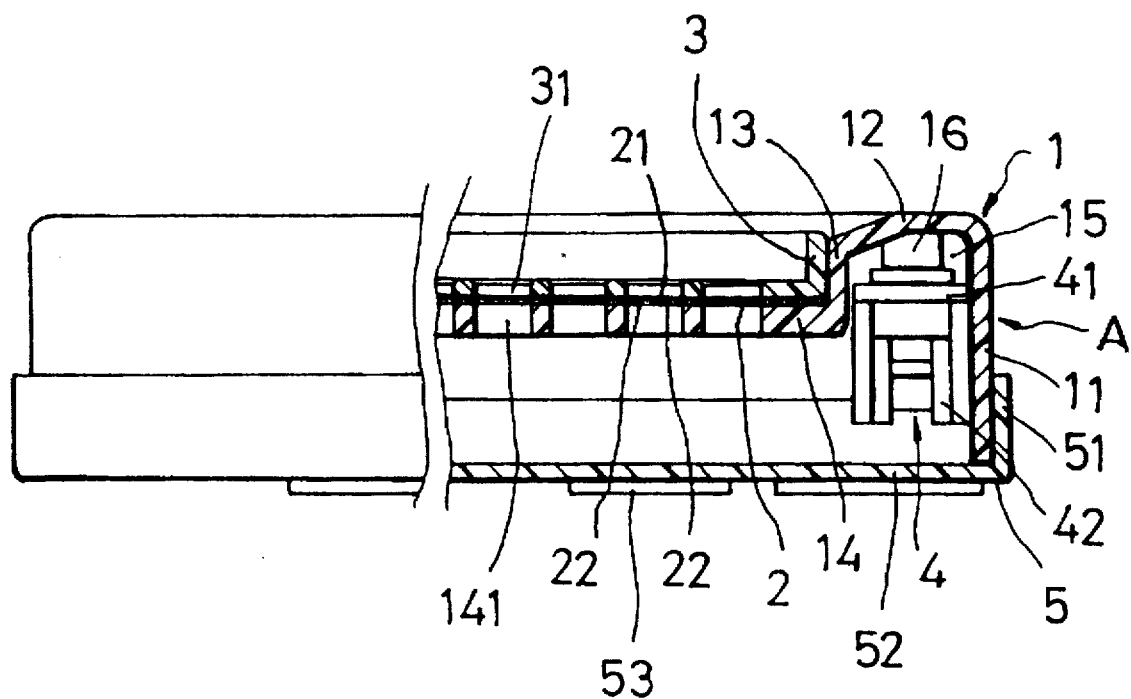
FIG. 2 is a partly sectional, schematic view of a drawing board of the preferred embodiment.

Referring to FIGS. 1 through 4, the preferred embodiment of a bead drawing kit according to the present invention is shown to comprise a drawing board (A) and a bead setting tool 6. The drawing board (A) includes a base member 1, a holding plate 2, a positioning plate 3, a stand unit 4 and a base cover 5.

The base member 1 has a looped upright surrounding wall 11, a radial inward flange 12 which extends from a top end of the surrounding wall 11 and which confines a recess 13, and a horizontal base plate 14 which is disposed in the surrounding wall 11 and which has a periphery connected to the surrounding wall 11 via the radial inward flange 12. The base plate 14 is formed with a plurality of lower holes 141 that are arranged in rows and columns. The base plate 14 has four corners provided respectively with a screw hole 142 and is further formed with four rows of pin holes 143. The base member 1 is formed with a downwardly opening looped receiving groove 15 between the surrounding wall 11 and the base plate 14. Screw sockets 16 are provided in left and right sides of the receiving groove 15. The surrounding wall 11 has an outer surface formed with opposite pairs of retaining grooves 111 (only one pair is shown).

The holding plate 2 is a resilient rubber member and is disposed in the recess 13 on top of the base plate 14. The holding plate 2 is formed with a plurality of cross-shaped slits 21, each of which is aligned with a respective one of the lower holes 141 in the base plate 14 and forms four resilient fins 22 on the holding plate 2. The holding plate 2 is further formed with pin holes 23 which are aligned with the pin holes 143 in the base plate 14, and through holes 24 which are aligned with the screw holes 142 in the base plate 14.

The positioning plate 3 is disposed in the recess 13 on top of the holding plate 2. Screws 30 extend through the screw holes 142 in the base plate 14 and the through holes 24 in the holding plate 2 so as to engage threadedly the positioning plate 3, thereby securing the positioning plate 3 to the base member 1 such that the holding plate 2 is clamped between the positioning plate 3 and the base plate 14. The positioning plate 3 is formed with a plurality of upper holes 31 that are aligned with the slits 21 in the holding plate 2, and a plurality of positioning pins 34 that extend through the pin holes 23 in the holding plate 2 and the pin holes 143 in the base plate 14.

The stand unit 4 includes a pair of mounting pieces 41 and a stand body 42. Screws 43 are provided to secure the mounting pieces 41 to the screw sockets 16 in the receiving groove 15 of the base member 1. Each mounting piece 41 is formed with a pair of pivot portions 411. The pivot portions 411 are formed with aligned retaining holes 412 and aligned positioning holes 413. The stand body 42 is a generally U-shaped member with a surface contacting portion 421 and a parallel pair of transverse arm portions 422 which extend respectively from two ends of the surface contacting portion 421. Each of the arm portions 422 has a distal end formed with a pair of pivot projections 423 for engaging pivotally the retaining holes 412 in the pivot portions 411 of a respective one of the mounting pieces 41, and a pair of positioning stubs 424 for engaging releasably the positioning holes 413 in the pivot portions 411 of the respective one of the mounting pieces 41.

The base cover 5 is used to cover a bottom end of the base member 1 and includes a bottom plate 52 and a looped peripheral wall 51 which extends from the bottom plate 52. The peripheral wall 51 has an inner surface formed with retaining projections 511 for engaging removably the retaining grooves 111 in the surrounding wall 11 of the base member 1. The bottom plate 52 has a lower side formed with a number of supporting feet 53 to prevent sliding of the drawing board (A) on a support surface, such as a table. The bottom plate 52 has one corner formed with an inclined slot 521. A slide piece 54 is mounted on the bottom plate 52 to open or close the slot 521 selectively.

Figure 3:
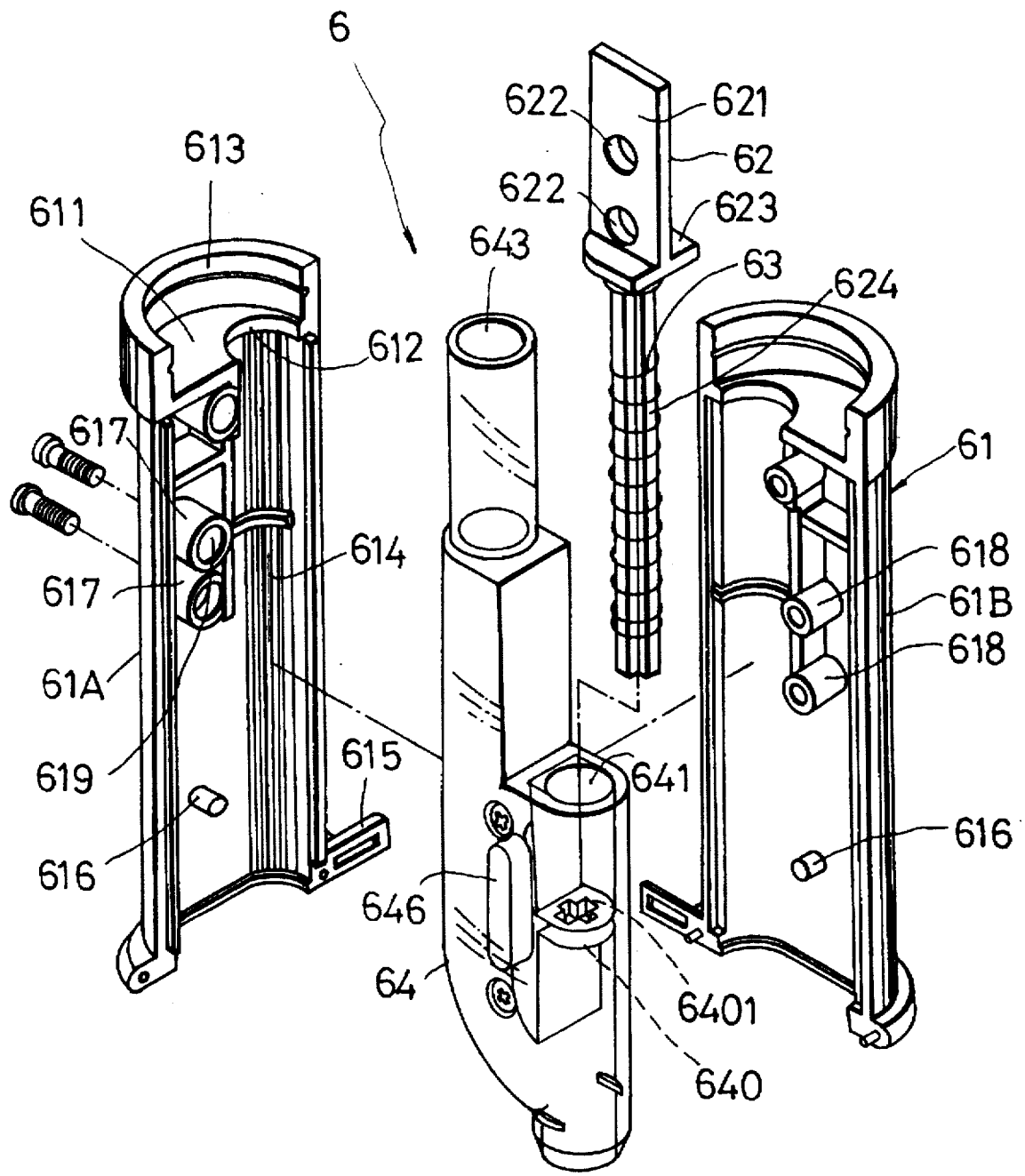
FIG. 3 is an exploded view of a bead setting tool of the preferred embodiment.
Figure 4:
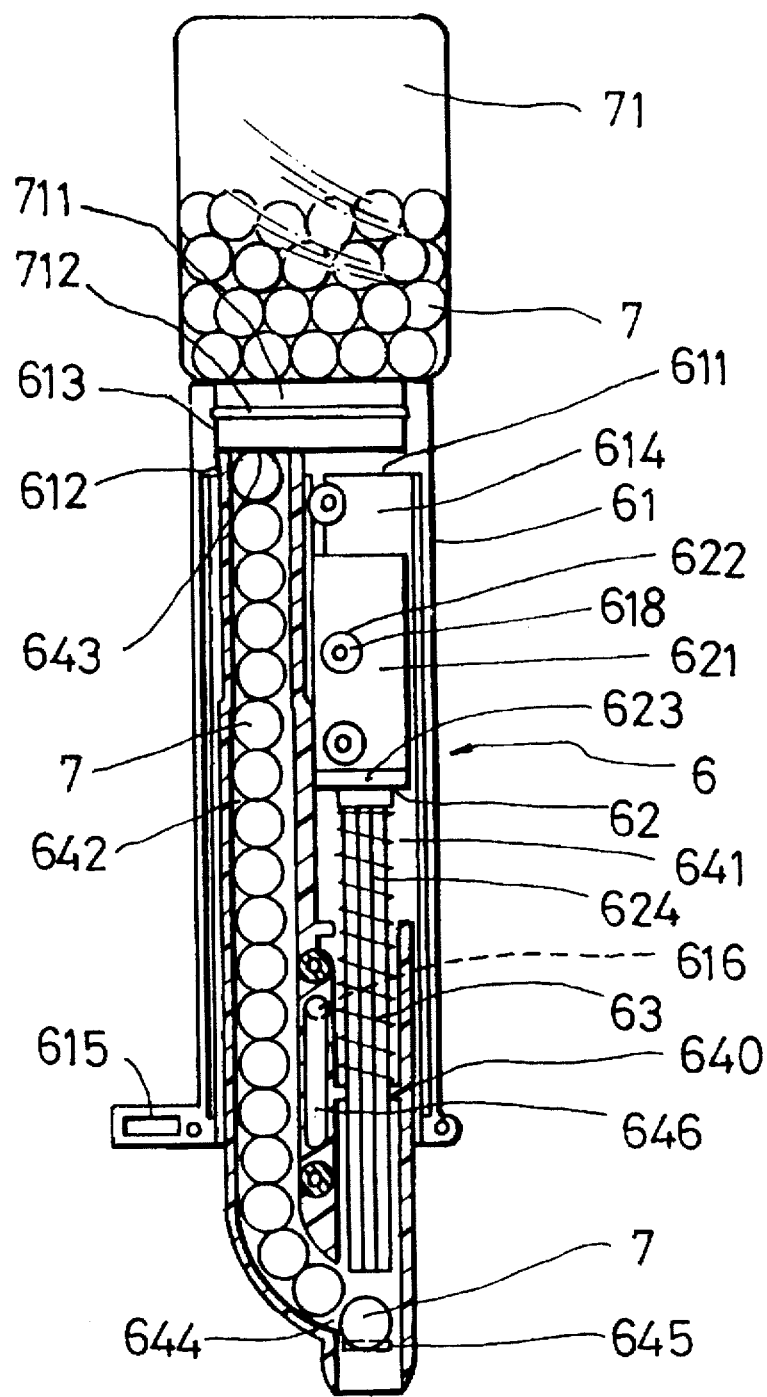
FIG. 4 is a sectional view of the bead setting tool of the preferred embodiment.

Referring to FIGS. 3 and 4, the bead setting tool 6 includes an elongated housing 61, a push rod 62, a biasing unit 63 and a bead guiding case 64.

The housing 61 includes complementary first and second housing parts 61A, 61B. The housing 61 has a top portion formed with a horizontal partition plate 611. The partition plate 611 is provided with an opening 612. A retaining space 613 is formed above the partition plate 611, while a receiving chamber 614 is formed below the partition plate 611. The housing 61 is formed with a radial outward press projection 615. Each of the housing parts 61A, 61B has a lower portion formed with an inward key projection 616. Each of the housing parts 61A, 61B is further formed with a pair of hollow inwardly projecting insert posts 617, 618 below the partition plate 611. Each of the insert posts 617 on the first housing part 61A confines a bore 619 for receiving one of the insert posts 618 on the second housing part 61B.

The push rod 62 has a flat top portion 621 formed with a pair of holes 622 for the insert posts 618 on the second housing 61B to extend therethrough. The top portion 621 is further formed with a pair of flanges 623 to be clamped by the first and second housing parts 61A, 61B. The push rod 62 further has a shank portion 624 which extends downwardly from the top portion 621 and which has a cross-shaped cross section. The biasing unit 63 is in the form of a coil spring and is sleeved on the shank portion 624. The housing 61 is sleeved on the bead guiding case 64.

The bead guiding case 64 includes a first tubular portion 641 which is formed with an inward flange 640 that confines a cross-shaped opening 6401 to enable the shank portion 624 of the push rod 62 to extend slidably therethrough. The biasing unit 63 is thus disposed between the flanges 623 on the push rod 62 and the inward flange 640. The bead guiding case 64 further includes a second tubular portion 642 which is parallel to and which is disposed on one side of the first tubular portion 641. The second tubular portion 642 has an open top section 643 which is aligned with the opening 612 in the partition plate 611 of the housing 61. The second tubular portion 642 has a curved bottom section 644 which merges with a bottom section of the first tubular portion 641. The bottom section of the first tubular portion 641 is formed with a seat projection 645 immediately below the curved bottom section 644. To guide and limit relative movement between the bead guiding case 64 and the housing 61, the bead guiding case 64 has an outer surface formed with a pair of longitudinal keyways 646 which slidably engage the key projections 616 on the housing parts 61A, 61B of the housing 61.

Referring to FIGS. 1 and 4, each of a plurality of beads 7 has a size which is slightly smaller than the upper holes 31 in the positioning plate 3, the lower holes 141 in the base plate 14, and the passage confined by the second tubular portion 642. The seat projection 645, however, confines a passage which is slightly smaller than the size of the beads 7 so as to prevent untimely movement of the beads 7 through the open bottom section of the first tubular portion 641 of the bead guiding case 64. To facilitate the supply of the beads 7 to the second tubular portion 642 of the bead guiding case 64, the beads 7 are preferably disposed in a container 71. The container 71 has an open end portion 711 which can be removably retained in the retaining space 613 of the housing 61. The open end portion 711 is formed with an annular projection 712 for removably engaging a cap 72 when the container 71 is detached from the housing 61.

Referring once more to FIG. 1, the bead drawing kit further comprises a plunger unit 8 which includes a base portion 81 which can be removably retained in the retaining space 613 of the housing 61. The base portion 81 is formed with a plurality of press pins 82 to be aligned selectively with some of the upper holes 31 in the positioning plate 3. Thus, the distance between adjacent two of the press pins 82 should correspond to that between adjacent two of the upper holes 31.

When assembling the drawing board (A), the holding plate 2 and the positioning plate 3 are disposed on top of the base plate 14 in the recess 13 of the base member 1. The positioning pins 34 on the positioning plate 3 extend through the pin holes 23, 143 in the holding plate 2 and the base plate 14 to arrest lateral movement of the holding plate 2. The slits 21 in the holding plate 2 are aligned with the upper and lower holes 31, 141 in the positioning plate 3 and the base plate 14 at this time. The screws 30 secure the positioning plate 3 to the base member 1. Thereafter, the screws 43 secure the mounting pieces 41 to the screw sockets 16 in the receiving groove 15 of the base member 1. The arm portions 422 of the stand body 42 are then connected pivotally to the mounting pieces 41 by virtue of engagement between the pivot projections 423 and the retaining holes 412 in the mounting pieces 41. Finally, the base cover 5 is attached removably to the surrounding wall 11 of the base member 1 by virtue of engagement between the retaining grooves 111 in the surrounding wall 11 and the retaining projections 511 on the peripheral wall 51 of the base cover 5.

Figure 5:
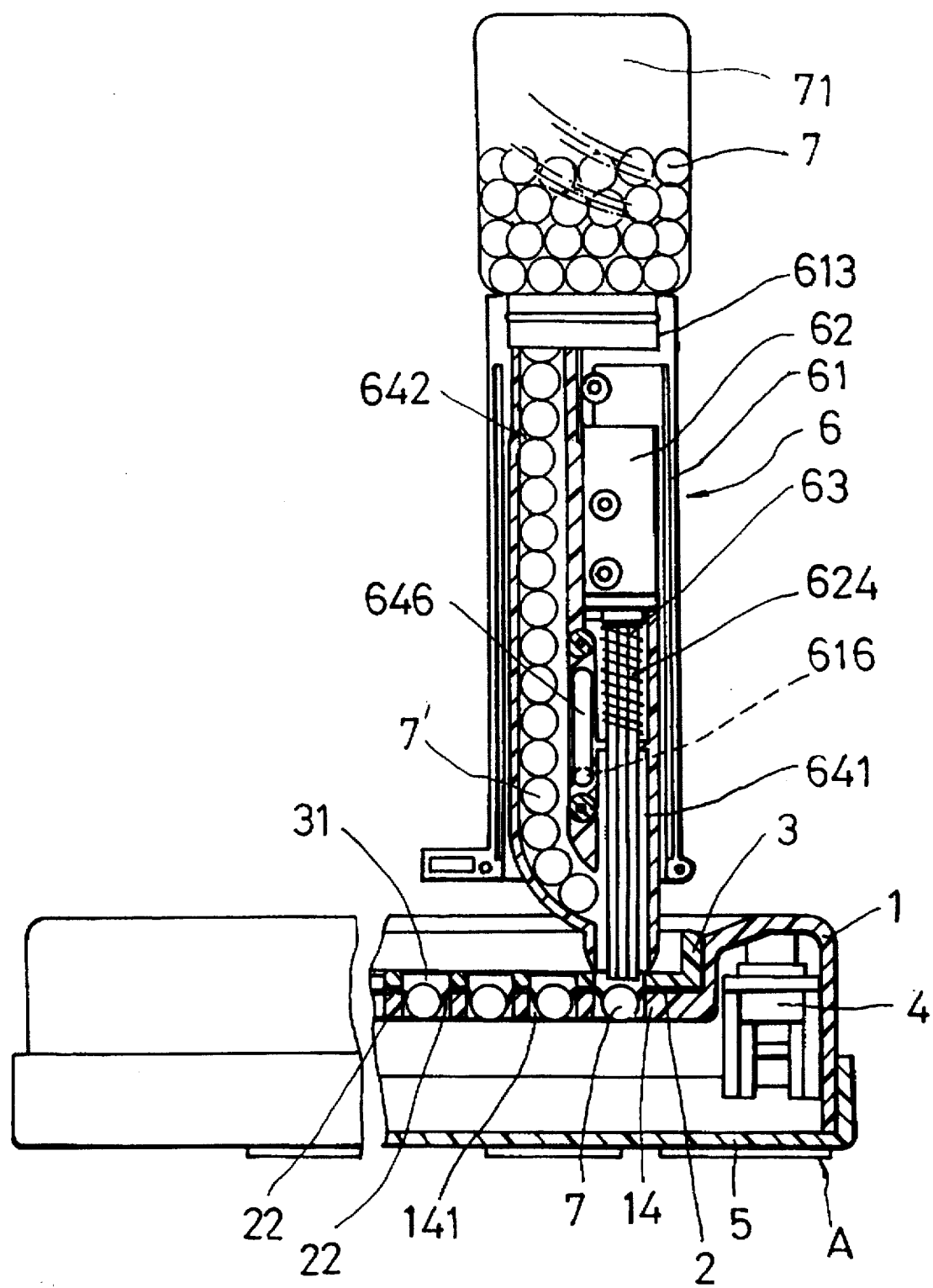
FIG. 5 illustrates how the bead setting tool is used to set beads on the drawing board in accordance with the present invention.

Referring to FIG. 5, when setting the beads 7 on the drawing board (A), the cap 72 is removed from the open end portion 711 of the container 71, and the open end portion 711 is retained in the retaining space 613 of the housing 61 of the bead setting tool 6. The beads 7 in the container 71 enter into the second tubular portion 642 of the bead guiding case 64 via the opening 612 in the partition plate 611 of the housing 61. At this time, a first one of the beads 7 enters into the first tubular portion 641 of the bead guiding case 64 and rests on the seat projection 645 in the latter. The biasing unit 63 biases the push rod 62 and the housing 61 upwardly such that the tip of the shank portion 624 of the push rod 62 is spaced from the first one of the beads 7 on the seat projection 645 at this time.

In use, the open bottom section of the first tubular portion 641 of the bead guiding case 64 is aligned with a selected one of the upper holes 31 in the positioning plate 3. The housing 61 of the bead setting tool 6 is then moved downwardly with respect to the bead guiding case 64 so as to result in corresponding movement of the push rod 62 against the action of the biasing unit 63. At this time, the first one of the beads 7 is forced by the push rod 62 to move past the seat projection 645, out of the open bottom section of the first tubular portion 641 of the bead guiding case 64, into the selected one of the upper holes 31 in the positioning plate 3, and into the aligned one of the slits 21 in the holding plate 2. The first one of the beads 7 is held in place on the holding plate 2 by the resilient fins 22 which are associated with the aligned one of the slits 21 at this time. The key projections 616 on the housing 61 abut against the lower end of the keyways 646 in the bead guiding case 64, thereby limiting further relative movement between the housing 61 and the bead guiding case 64 and preventing the push rod 62 from releasing the first one of the beads 7 from the holding plate 2.

Figure 6:
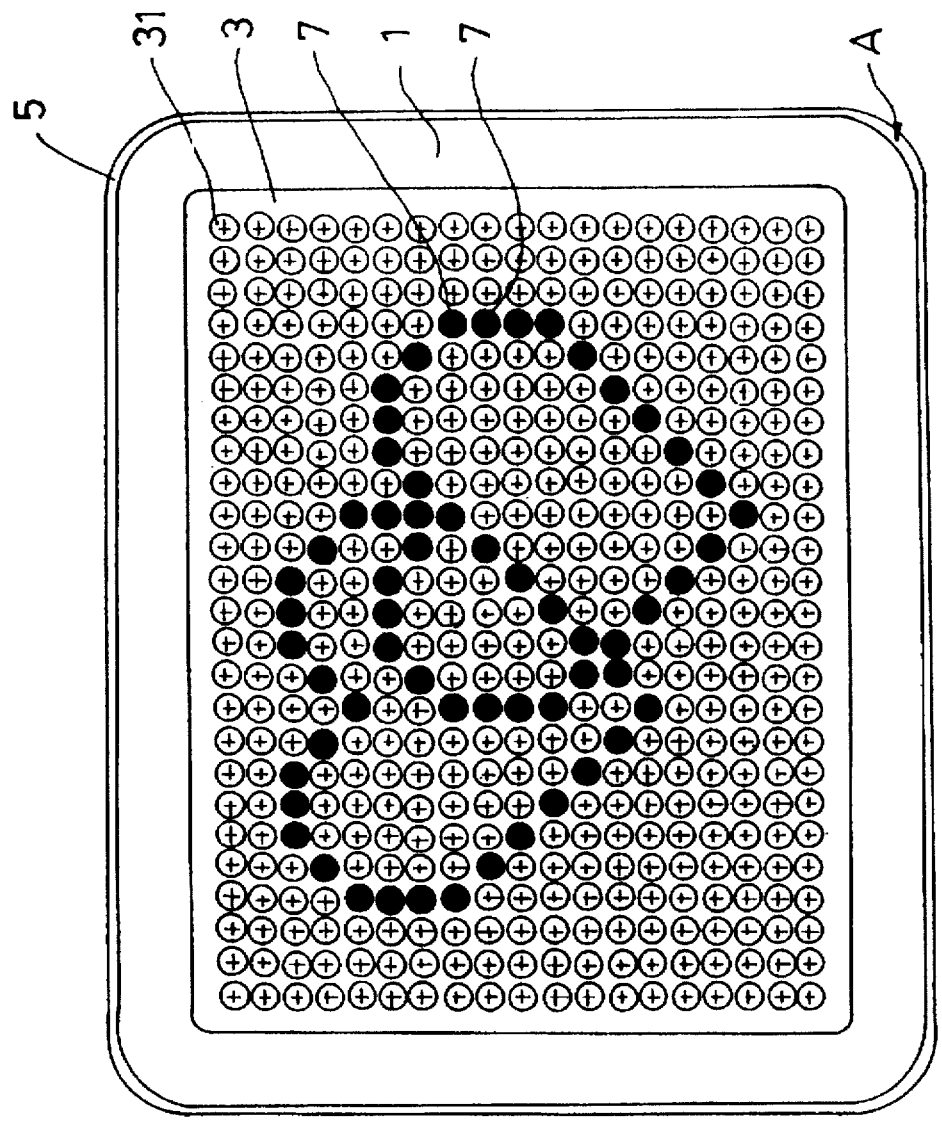
FIG. 6 illustrates a sample image which is formed on the drawing board with the use of beads in accordance with the present invention.

When the first one of the beads 7 is set on the drawing board (A), the housing 61 is released, thereby permitting expansion of the biasing unit 63 to result in upward movement of the housing 61 and the push rod 62 with respect to the bead guiding case 64. At this time, the push rod 62 ceases to block the curved bottom section 644 of the second tubular portion 642 of the bead guiding case 64, thereby permitting movement of a second one of the beads 7' into the first tubular portion 641 so as to rest on the seat projection 645. The aforementioned procedure is repeated until a desired image is formed by the beads 7 on the drawing board (A), as shown in FIG. 6.

If one of the beads 7 has been incorrectly set on the drawing board (A), the bead setting tool 6 may be operated such that the press projection 615 on the housing 61 depresses the incorrect one of the beads 7 so as to release the same from the holding plate 2. At this time, the released bead 7 moves through the aligned one of the lower holes 143 in the base plate 14 for collection in the base cover 5.

Figure 7:
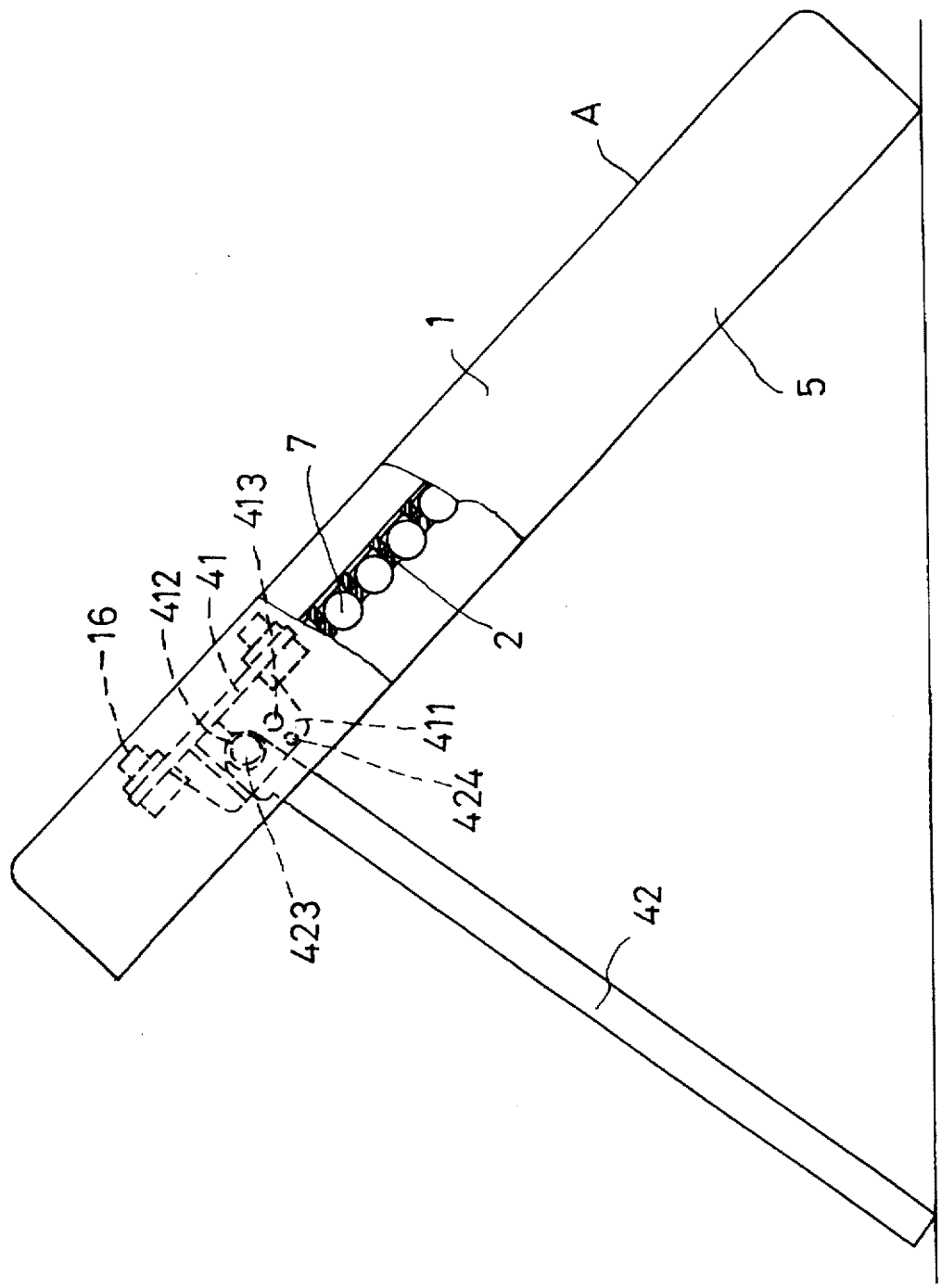
FIG. 7 is a schematic view which illustrates the drawing board of the preferred embodiment when placed uprightly on a support surface.

Referring to FIGS. 5 and 7, after the desired image has been formed on the drawing board (A), the base cover 5 can be removed from the base member 1, and the stand body 42 of the stand unit 4 can be pivoted with respect to the mounting pieces 41 from a first position, wherein the stand body 42 is disposed in the receiving groove 15, to a second position, wherein the stand body 42 forms an angle with the base member 1. The drawing board (A) can be placed uprightly on a support surface, in a manner similar to a conventional picture frame, at this time.

In this embodiment, the beads 7 are multi-colored and are transparent, thereby achieving a sparkling effect when struck by light.

Figure 8:
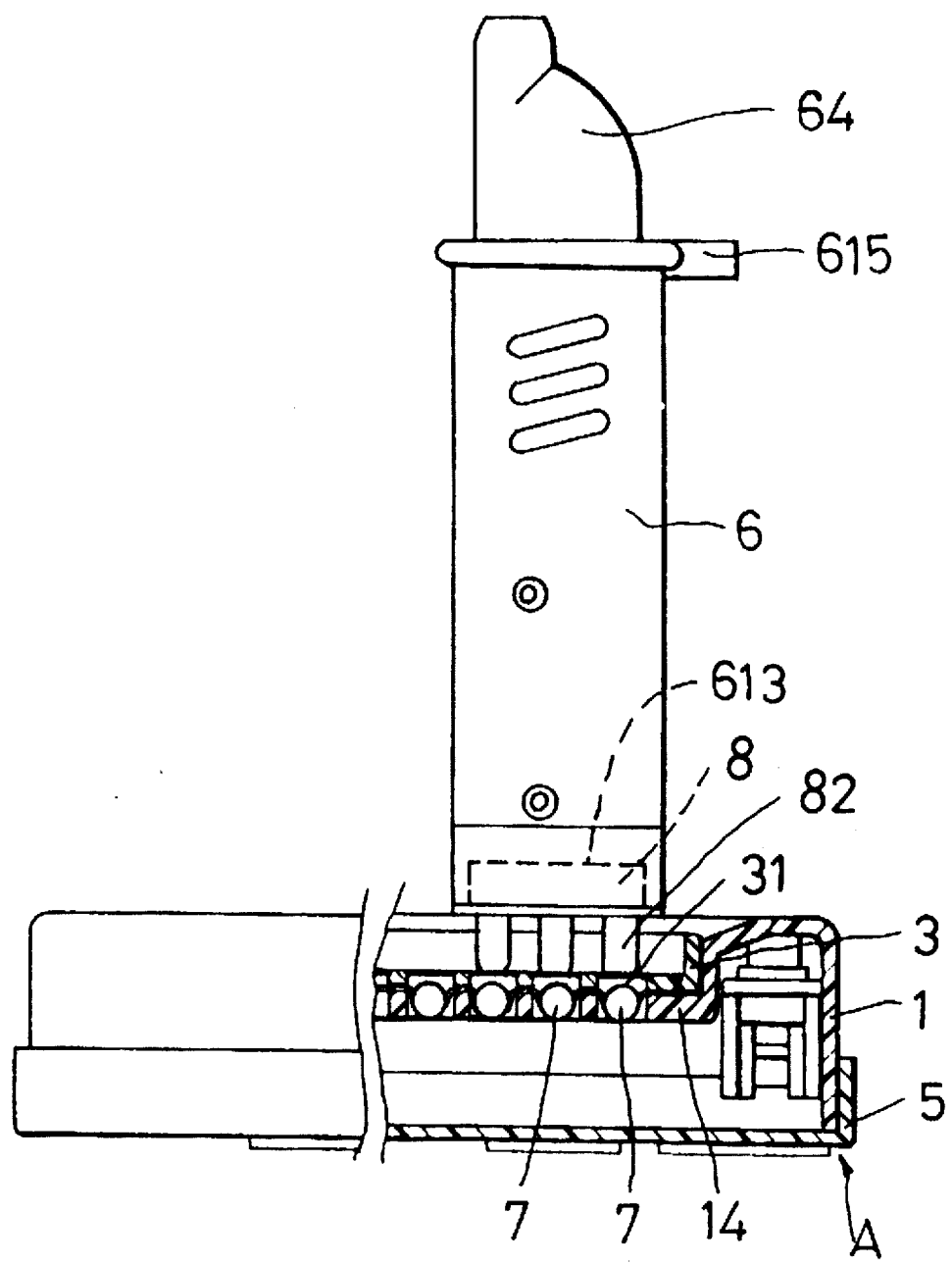
FIG. 8 illustrates how the beads are removed from the drawing board of the preferred embodiment.

Referring to FIGS. 1 and 8, when it is desired to remove the beads 7 from the drawing board (A), the container 71 is detached from the housing 61 of the bead setting tool 6, and the base portion 81 of the plunger unit 8 is retained in the retaining space 613 of the housing 61. The press pins 82 on the base portion 81 of the plunger unit 8 are aligned with some of the beads 7 on the drawing board (A), and the bead setting tool 6 is pushed downwardly, thereby enabling the press pins 82 to depress the aligned ones of the beads 7 so as to release the same from the holding plate 2. The released beads 7 move through the lower holes 143 in the base plate 14 for collection in the base cover 5. After the beads 7 have been released from the holding plate 2, the slide piece 54 is operated so as to open the slot 521 in the bottom plate 52 of the base cover 5. The beads 7 can be poured back into the container 71 via the slot 521 at this time.

It should be noted that the beads 7 can be manually set on and removed from the drawing board (A) without the use of the bead setting tool 6. Of course, use of the bead setting tool 6 is still preferred due to added convenience. In addition, the stand unit 4 should be considered as an optional feature which only serves to permit upright placing of the drawing board (A) on a support surface.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bead drawing kit comprising a plurality of beads and a drawing board which includes:

a base member having a looped upright surrounding wall and a horizontal base plate disposed in said surrounding wall, said base plate having a periphery connected to said surrounding wall and being formed with a plurality of lower holes that are arranged in rows and columns for passage of said beads therethrough;

a holding plate made of a resilient material and provided on said base plate, said holding plate being formed with a plurality of slits, each of which is aligned with a respective one of said lower holes in said base plate and forms at least two resilient fins on said holding plate for holding releasably one of said beads;

a positioning plate secured to said base plate such that said holding plate is clamped between said base plate and said positioning plate, said positioning plate being formed with a plurality of upper holes that are aligned with said slits in said holding plate to permit entry of said beads into said slits; and a base cover having a bottom plate and a looped peripheral wall which extends from said bottom plate and which engages removably said surrounding wall of said base member;

whereby, said beads can be set on said drawing board in selected ones of said slits in said holding plate to form a desired image on said drawing board, said beads being capable of being depressed to release said beads from said holding plate, said beads which are released from said holding plate passing through aligned ones of said lower holes in said base plate for collection in said base cover.

2. The bead drawing kit as claimed in claim 1, wherein said surrounding wall of said base member has a top end and said base member further has a radial inward flange which extends from said top end of said surrounding wall, said radial inward flange confining a recess and connecting said periphery of said base plate to said surrounding wall, said holding plate and said positioning plate being disposed in said recess.

3. The bead drawing kit as claimed in claim 1, wherein said base member is formed with a downwardly opening looped receiving groove between said surrounding wall and said base plate, said drawing board further including a stand unit, said stand unit including a stand body which has a parallel pair of arm portions with distal ends connected pivotally to said base member, said stand body being pivotable relative to said base member between a first position, wherein said stand body is disposed in said receiving groove, and a second position, wherein said stand body forms an angle with said base member so that said drawing board can be placed uprightly on a support surface.

4. The bead drawing kit as claimed in claim 1, wherein each of said base plate and said holding plate is formed with a plurality of aligned pin holes, said positioning plate being formed with a plurality of positioning pins that extend through said aligned pins holes in said base plate and said holding plate to arrest lateral movement of said holding plate.

5. The bead drawing kit as claimed in claim 1, wherein said holding plate is made of rubber.

6. The bead drawing kit as claimed in claim 1, wherein said slits in said holding plate are cross-shaped.

7. The bead drawing kit as claimed in claim 1, wherein said bottom plate of said base cover has one corner formed with an inclined slot, said base cover further having a slide piece mounted on said bottom plate for opening or closing said slot selectively.

8. The bead drawing kit as claimed in claim 1, wherein said beads are multi-colored.

9. The bead drawing kit as claimed in claim 8, wherein said beads are transparent.

10. The bead drawing kit as claimed in claim 1, further comprising a plunger unit formed with a plurality of press pins to be aligned selectively with some of said upper holes in said positioning plate of said drawing board and operable so as to release aligned ones of said beads from said holding plate of said drawing board.

11. The bead drawing kit as claimed in claim 1, further comprising a bead setting tool for setting said beads on said drawing board.

12. The bead drawing kit as claimed in claim 11, wherein said bead setting tool comprises:

a bead guiding case having a first tubular portion with an open bottom section, and a second tubular portion which is parallel to and which is disposed on one side of said first tubular portion, said second tubular portion having an open top section for passage of said beads thereinto and a curved bottom section which merges with said bottom section of said first tubular portion, said bottom section of said first tubular portion being formed with a seat projection immediately below said curved bottom section of said second tubular portion to permit entry of said beads in said second tubular portion into said first tubular portion one at a time, said seat projection confining a passage which is slightly smaller than said beads so that a first one of said beads from said second tubular portion can rest on said seat projection;

an elongated housing sleeved on said bead guiding case;

a push rod disposed in said housing and having a top portion which is secured to said housing and a shank portion which extends downwardly from said top portion and which extends slidably into said first tubular portion of said bead guiding case, said push rod being movable with said housing relative to said bead guiding case between a first position, wherein said shank portion of said push rod has a tip which is spaced from said first one of said beads on said seat projection, and a second position, wherein said shank portion of said push rod forces said first one of said beads out of said seat projection for setting said first one of said beads on said drawing board; and a biasing unit provided in said housing for biasing said push rod to said first position.

13. The bead drawing kit as claimed in claim 12, wherein one of said housing and said bead guiding case is formed with a longitudinal keyway, the other one of said housing and said bead guiding case being formed with a key projection which extends into said keyway to guide and limit relative movement between said housing and said bead guiding case.

14. The bead drawing kit as claimed in claim 12, wherein said housing is formed with a radial outward press projection for releasing said beads on said holding plate.

15. The bead drawing kit as claimed in claim 12, wherein said housing has a top portion formed with a horizontal partition plate, said partition plate being formed with an opening to permit passage of said beads into said open top section of said second tubular portion of said bead guiding case.

16. The bead drawing kit as claimed in claim 15, wherein said top portion of said housing is formed with a retaining space above said partition plate, said bead setting tool further including a container for containing said beads therein, said container having an open top portion which is removably retained in said retaining space of said housing.

17. The bead drawing kit as claimed in claim 16, wherein said container is provided with a removable cap for closing selectively said open top portion thereof.

18. The bead drawing kit as claimed in claim 15, wherein said top portion of said housing is formed with a retaining space above said partition plate, said bead setting tool further including a plunger unit which has a base portion removably retained in said retaining space, said base portion being formed with a plurality of press pins to be aligned selectively with some of said upper holes in said positioning plate of said drawing board, said plunger unit being operable so as to release aligned ones of said beads from said holding plate of said drawing board.

* * * * *